United States Patent

Moore et al.

(10) Patent No.: US 10,223,716 B2
(45) Date of Patent: Mar. 5, 2019

(54) SYSTEMS AND METHODS FOR MONITORING AND VALUATING TRANSACTIONS FOR DOCUMENT PROCESSES

(71) Applicant: Lexmark International, Inc., Lexington, KY (US)

(72) Inventors: Sterling Anson Moore, Lexington, KY (US); Norman Erik Stang, Versailles, KY (US)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 762 days.

(21) Appl. No.: 14/308,865

(22) Filed: Jun. 19, 2014

(65) Prior Publication Data

US 2015/0371293 A1 Dec. 24, 2015

(51) Int. Cl.
*G06F 3/01* (2006.01)
*G06Q 30/04* (2012.01)
*H04L 29/06* (2006.01)

(52) U.S. Cl.
CPC ............. *G06Q 30/04* (2013.01); *H04L 67/42* (2013.01)

(58) Field of Classification Search
CPC ........... G06F 3/01; G06Q 40/00; G06K 15/00
USPC .................................. 358/1.13, 3.27; 705/30
See application file for complete search history.

(56) References Cited

U.S. PATENT DOCUMENTS

| | | | | |
|---|---|---|---|---|
| 5,800,181 A * | 9/1998 | Heinlein | ................ | G06Q 10/10 434/322 |
| 6,996,538 B2 * | 2/2006 | Lucas | .................... | G06Q 10/06 705/26.41 |
| 8,351,059 B2 * | 1/2013 | Mori | ..................... | G06F 21/121 358/1.14 |
| 8,400,260 B2 * | 3/2013 | Stephenson | ............... | H04L 9/32 340/12.4 |
| 8,804,159 B2 * | 8/2014 | Mori | ..................... | G06F 21/121 358/1.14 |
| 8,810,848 B2 * | 8/2014 | Nakajima | ............ | H04N 1/3871 345/629 |
| 9,298,981 B1 * | 3/2016 | Ragnet | ............... | G06K 9/00442 |
| 9,330,181 B2 * | 5/2016 | Ahmed | ............ | G06F 17/30864 |
| 2001/0049666 A1 * | 12/2001 | Prakken | ................. | G06F 21/10 705/59 |
| 2002/0157028 A1 * | 10/2002 | Koue | ........................ | H04L 9/32 726/3 |
| 2003/0028495 A1 * | 2/2003 | Pallante | ................. | G06Q 20/00 705/78 |
| 2003/0041096 A1 * | 2/2003 | Johnson | .................... | G06F 8/60 709/201 |
| 2004/0073708 A1 * | 4/2004 | Warnock | ............. | G06F 17/2247 709/246 |
| 2004/0212823 A1 * | 10/2004 | Chavers | ............. | H04N 1/00411 358/1.15 |

(Continued)

*Primary Examiner* — Oluseye Iwarere (57) ABSTRACT

A method of charging a customer for using a software program product that processes one or more documents that includes receiving, by a tracking server from at least one client application, information relating to a processing of a document using the software program product; determining if the information indicates a successful processing of the document; and upon positive determination, charging the customer with an amount for the successful processing of the document using the software program product.

11 Claims, 7 Drawing Sheets

(56) References Cited

U.S. PATENT DOCUMENTS

| | | | | |
|---|---|---|---|---|
| 2005/0243379 A1* | 11/2005 | Klein | G07F 19/00 |
| | | | 358/3.27 |
| 2006/0004761 A1* | 1/2006 | Maselli | G06Q 10/08 |
| 2008/0225320 A1* | 9/2008 | Ferlitsch | G03G 21/02 |
| | | | 358/1.13 |
| 2009/0279108 A1* | 11/2009 | Hoshi | H04N 1/3871 |
| | | | 358/1.2 |
| 2010/0026448 A1* | 2/2010 | Stephenson | H04L 9/32 |
| | | | 340/5.2 |
| 2010/0231949 A1* | 9/2010 | Mori | G06F 21/121 |
| | | | 358/1.14 |
| 2010/0235369 A1* | 9/2010 | Evanitsky | G16H 40/20 |
| | | | 707/756 |
| 2011/0060622 A1* | 3/2011 | Piersol | G06F 11/1474 |
| | | | 707/637 |
| 2011/0137761 A1* | 6/2011 | McDermott | G06Q 40/02 |
| | | | 705/30 |
| 2013/0094049 A1* | 4/2013 | Mori | G06F 21/121 |
| | | | 358/1.14 |
| 2013/0278970 A1* | 10/2013 | Hoshi | H04N 1/3871 |
| | | | 358/1.18 |
| 2013/0311651 A1* | 11/2013 | Olsson | G06Q 10/06 |
| | | | 709/224 |
| 2014/0149380 A1* | 5/2014 | Ahmed | G06F 17/30864 |
| | | | 707/709 |

* cited by examiner

SYSTEMS AND METHODS FOR MONITORING AND VALUATING TRANSACTIONS FOR DOCUMENT PROCESSES

FIELD OF THE INVENTION

The present invention relates to monitoring document processing transactions in a client application. More particularly, it relates to monitoring document processing transactions in a client application and valuating the transactions to determine a billing amount.

BACKGROUND

In a typical enterprise that manages a significant number of documents, document processing solutions are usually utilized to process these documents. These document processing solutions have functionalities for handling the documents such as, for example, document routing, document conversion from one format to another, document indexing, document search, document archival and the like. For every instance a processing is performed on a document using the document processing solution, a document processing transaction occurs.

Document processing solutions are traditionally sold and deployed on a project basis, wherein the selling price of the solution is based on a value of the software product and/or the front-loaded project costs to implement the solution. This pricing set-up may limit solutions deployment to businesses that cannot afford the upfront cost and may have varying usage levels of the solutions over time. For example, one company may find the cost of the software product too high when it intends to use the product to process or manage documents at a smaller volume or for only a limited period of time. Meanwhile, another company may have a higher throughput of document processing transactions using the solution. Having higher document processing throughput may increase the ongoing maintenance costs of the solution—a variable which might not be reflected in the selling price of the solution. Currently, there are no service methods that interact directly or peripherally with clients of a solution to quantify and valuate the throughput of business operations software that processes documents.

Accordingly, a need exists in the art for a method of quantifying and valuating document processing transactions in a client application performed using a software program product. What is needed is a method of monitoring discrete document processing transactions and valuating these transactions for use in charging one or more registered clients for using the software program product. What is also needed is a method that provides solution providers a methodology and framework for quantifying and valuating discrete transactions. Additional benefits and alternatives are also sought when devising solutions.

SUMMARY

The above-mentioned and other problems are solved by systems and methods for charging a customer for using a software program product that processes one or more documents. In a representative embodiment, the method includes receiving, by a tracking server from at least one client application, information relating to a processing of a document using the software program product. The tracking server then determines if the information indicates a successful processing of the document, and upon positive determination, charging the customer with an amount for the successful processing of the document using the software program product.

The client application may send information relating to the successful processing of the document using the software program product if the document was processed completely and successfully with zero to minimal errors. In another example embodiment, the client application may send the information relating to the successful processing of the document if it is determined that the processing is not redundant to a previous processing of the document performed using the software program product. In yet another example embodiment, the client application may send the information relating to the successful processing of the document if it is determined that the processing has met a confidence level that will indicate that the processing of the document is successful.

These and other example embodiments are set forth in the description below. Their advantages and features will become readily apparent to skilled artisans. The claims set forth particular limitations.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE ILLUSTRATED EMBODIMENTS

In the following detailed description, reference is made to the accompanying drawings where like numerals represent like details. The example embodiments are described in sufficient detail to enable those skilled in the art to practice the invention. It is to be understood that other example embodiments may be utilized and that process, electrical, and mechanical changes, etc., may be made without departing from the scope of the disclosure. The following detailed description, therefore, is not to be taken in a limiting sense and the scope of the invention is defined only by the appended claims and their equivalents. In accordance with the features of the disclosure, systems and methods for charging a customer for using software program product that processes one or more documents are provided wherein a tracking server receives from at least one client application, information relating to a processing of a document using the software program product, determines if the information indicates a successful processing of the document, and upon positive determination, charges the customer with an amount for the successful processing of the document using the software program product.

Figure 1:
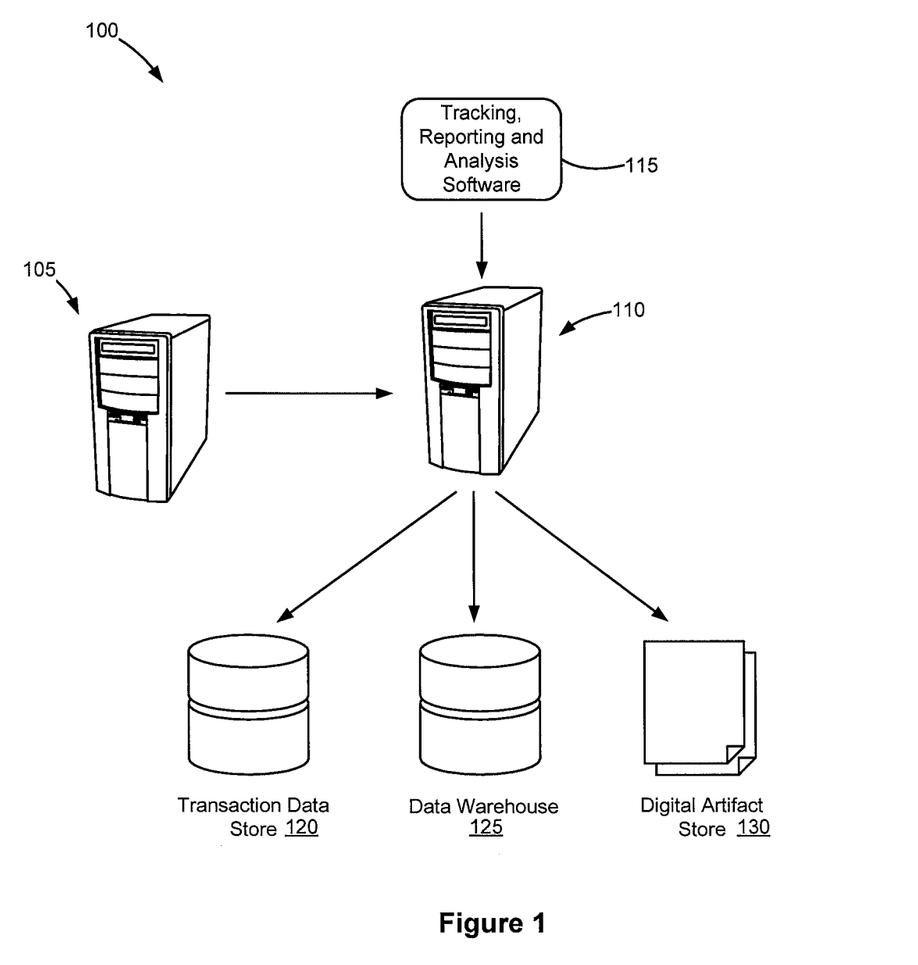
FIG. 1 shows an example document processing system for monitoring, valuating, and charging a customer on a document processing transaction successfully performed using a software program product in at least one client application connected to a tracking server.

With reference to FIG. 1, there is shown example document processing system 100 for monitoring, valuating, and charging a customer for a document processing transaction successfully performed using a software program product in at least one client application connected to a tracking server. System 100 includes at least one client application 105, a tracking server 110, a tracking, reporting and analysis software 115, a transaction data store 120, a data warehouse 125, and a digital artifact store 130.

Client application 105 is a computing device having an interface component adapted to connect to tracking server 110. For example, client application 105 may be a server class computer or any device that includes a processor (not shown) and a computer-readable medium (not shown), such as a random access memory (RAM), coupled to the processor. The processor executes computer-executable program instructions stored in the memory. Computer-executable program instructions stored in the memory includes one or more applications that process documents such as, for example, a document routing solution that routes a document from one user to another for review, approval and/or reference. An instance of the document routing solution routing the document between users may be referred to herein as an example document processing transaction. Other examples of document processing transactions may include document indexing, document search, document archiving, document conversion, document transformation, optical character recognition, intelligent character recognition, page orientation detection, noise filtering, contrast enhancement, sharpening, cropping, rotation, skew correction, format conversion, form data extraction, bar code reading, archive to database, archive to file store, archive to document management system, e-mailing, faxing, printing, and transferring files through a file transfer protocol. Other data processes that may be performed on one or more documents will be known by skilled artisans.

In one example embodiment, the document processing transactions may be performed by at least one software program product installed in client application 105. The at least one software program product may be sold to a customer and deployed in client application 105 with zero to minimal cost and the charging of the customer that uses the software program product will instead be performed by monitoring and valuating the document processing transactions executed in client application 105 using the software program product, and charging the customer based on the successful processing of the documents.

Tracking server 110 is a computing device communicatively connected to client application 105 and comprises tracking, reporting and analysis software 115, and one or more databases such as transaction data store 120, data warehouse 125, and digital artifact store 130. Tracking server 110 may be a server class computer that includes the one or more databases and the tracking, reporting and analysis software 115 to receive data to store in the one or more databases.

Tracking, reporting and analysis software 115 is a computer program product that monitors the document process transactions executed in client application 105 using the software program product and stores transaction data in the databases. In one example embodiment, tracking, reporting and analysis software 115 may be installed in client application 105 and is able to monitor the document process transactions executed in client application 105 and send data relating to the transactions to tracking server 110. In an alternative example embodiment, software 115 may be in tracking server 110 and is configured to receive transaction data from client application 105 through one or more electronic means as will be known in the art.

Tracking, reporting and analysis software 115 may include one or more computer executable instructions that allow a user to register client application 105 to the tracking server 110 to enable software 115 to monitor the document process transactions executed in client application 105 using the software program product. Software 115 may also include other functionalities such as recording the transaction data to the transaction data store 120, transforming the data to a format and saving the formatted data to data warehouse 125, and storing transaction artifacts (if any) to digital artifact store 130. The transaction data may later be used for costing, billing, auditing and other purposes as will be discussed in greater detail below.

Transaction data store 120, data warehouse 125, and digital artifact store 130 are databases hosted in tracking server 110 for storing data from client application 105 through tracking, reporting and analysis software 115. Transaction data store 120 stores raw transaction data relating to the transactions executed in client application 105, while data warehouse 125 stores a formatted version of the transaction data in transaction data store. The formatting of the data for storing in data warehouse 125 may be performed by tracking, reporting and analysis software 115 such that the data is converted to a format appropriate for analysis and reporting such as, for example, using online analytical processing (OLAP) processes, or for generating billing reports. Digital artifact store 130 is used for storing transaction artifacts such as, for example, a converted document when the document processing transaction performed in client application 105 is a conversion process. Other transaction artifacts will be known by skilled artisans.

Figure 2:
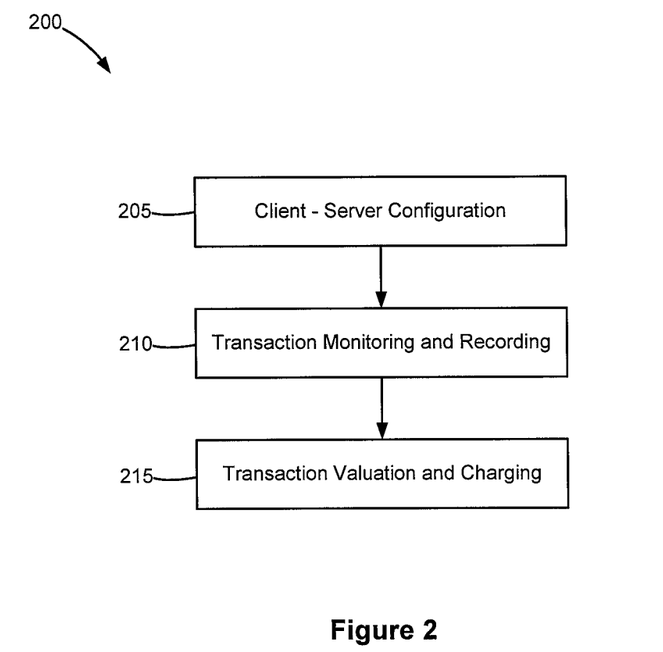
FIG. 2 shows an example method of monitoring and valuating one or more document transactions executed in client application using a software program product.

FIG. 2 shows an example method 200 of monitoring and valuating one or more document transactions executed in client application 105 using a software program product to determine an amount to be charged to customer for the use of the software program product. Method 200 is performed by tracking, reporting and analysis software 115 that communicates with client application 105 and/or tracking server 110 to monitor the document transactions on a registered client application, assign a billing amount to the document transactions, manage data relating to the transactions, and generate billing reports using the data.

At block 205, client 105 and tracking server 110 are configured to communicate each other through one or more communications links, as will be known to skilled artisans. Setting up client 105 and tracking server 110 configuration includes registering client 105 to tracking server 110 such that tracking server 110 is now enabled to listen to and/or receive one or more events in client 105 that indicate that a document processing transaction has been performed in client application 105 using the software program product.

Figure 3:
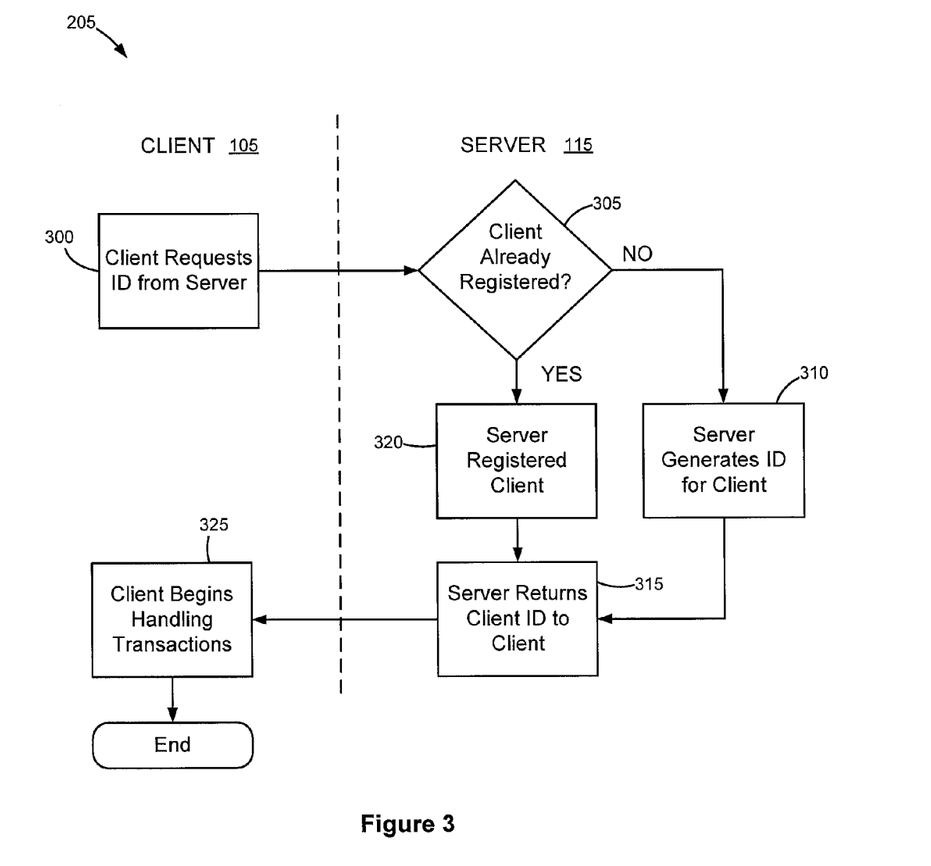
FIG. 3 shows an example method of a client application registering to a tracking server.

FIG. 3 shows an example method 205 of a client application 105 registering to tracking server 110. Client application 105 may register to tracking server 110 to allow tracking server 110 to receive and/or collect document processing transaction data occurring in client application 105 using the software program product. Registration of client application 105 to tracking server 110 may be performed by a user of client application 105, or automatically by client application 105 in response to one or more events such as, for example, a launching of the software program product.

In one example embodiment, method 205 in FIG. 3 may be a registration process wherein a client application 105 formerly unregistered to tracking server 110 requests for an identifier. In an alternative example embodiment, method 205 may be a log-in process wherein a registered client application logs in to tracking server 110 through a request of its registration identifier, and in response to the request, tracking server 110 logs in client application 105 and begins monitoring one or more document processing transactions in client application 105.

Alternatively, when client application 105 belongs to a clustered environment, there may be numerous client applications that each register with tracking server 110 independently. In one aspect, the whole cluster may be considered a single system and may register once. In registering with tracking server 110, the client applications indicate what type of client they are so their data is interpreted correctly. Client applications may also provide one or more parameters to uniquely identify them in later reporting (such as, for example, an IP address of each of the client applications). In return, tracking server 110 may provide each client application 105 with a client identifier which each of the client applications may use to identify themselves in all subsequent calls to tracking server 110.

At 300, client application 105 requests an identifier from tracking server 110. The identifier may be a unique identification assigned to client application 105 to tracking server 110 that indicates that a client application has been registered to tracking server 110 for document process transactions monitoring purposes. Each registered client application may be provided a unique identifier to indicate that it has been registered to tracking server 110. The identifier may be associated to an identifying data of client application 105, such that tracking server 110 may retrieve data associated with client application 105 to verify if client application 105 has been registered to tracking server 110. Identifying data of client application may include, but are not limited to, a MAC address of client application 105, an IP address, and other identifying data of devices as will be known by skilled artisans.

At 305, a determination is performed to verify if client application 105 has been registered to tracking server 110. Determining if the client application 105 is registered to tracking server 110 includes the tracking server 105 retrieving an identifying data of client application 105, and checking if the retrieved data is associated with an identifier on a list of identifiers for registered client applications. If tracking server 110 determines that the client application 105 has not been registered, such that no identifier is associated with the identifying data of the client application 105, tracking server 110 generates an identifier for client application 105, and registers client application 105 to its list of devices to start monitoring for document processing transactions (at 310). After registering client application 105, tracking server 110 then retrieves the generated identifier and returns it to client application 105 (at block 315).

If tracking server 110 determines that client application 105 has already been registered such that an existing identifier is associated with the requesting client application 105, tracking server 110 retrieves the requested identifier and returns it to client application 105 (at 320). This may be an example of a log-in process wherein tracking server 110 determines if client application 105 is a registered device, and upon positive determination, tracking server 110 begins monitoring document processing transactions in client application 105.

At 325, after having received the requested identifier, client application 105 may begin handling document processing requests using the software program product and sending document processing transaction data to tracking server 110 for monitoring.

In one example embodiment, client application 105 may not authorize any user to perform any document processing transaction using the software program product in client application 105 until client application 105 is registered to tracking server 110 such that the requested identifier has already been received by client application 105 from tracking server 110.

With continued reference to method 200 of FIG. 2, after client application 105 has registered and logged in to tracking server 110, a document processing transaction monitoring and recording may be performed (at 210).

In one example embodiment, monitoring and recording of document processing transactions performed in client application 105 using the software program product is performed such that client application 105 is able to send data to tracking server 110. In this example embodiment, client application 105 sends document processing transaction data to tracking server 110 in real time, or as the documents are processed by the software program product.

Figure 4:
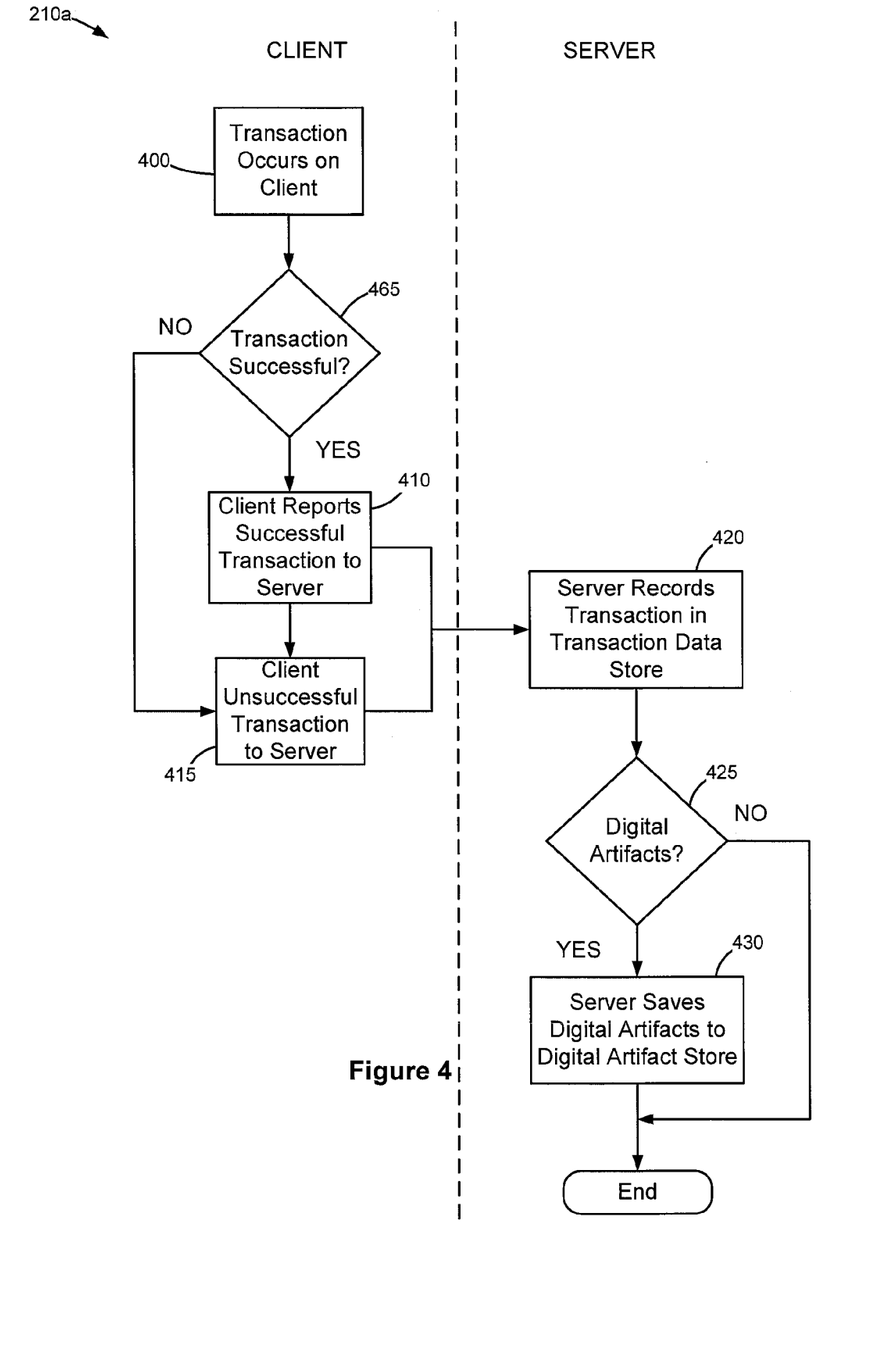
FIG. 4 shows an example method of real-time monitoring and recording transactions in a client application by a tracking server.

FIG. 4 shows one example method 210 of real-time monitoring and recording transactions in client application 105 by tracking server 110, such that client application 105 sends data to tracking server 110 as the document is processed in client application 105 using the software program product.

At 400, client application 105 listens for an event that indicates that a document is being processed by the software program product. At 405, it is determined is the document processing transaction is successful. A successful transaction refers to a successful processing of the document such as, for example, when the document has been successfully routed or successfully converted, depending on the type of transaction being performed on a document. A successful document processing transaction may refer to a processing of the document with substantially zero errors, and approximately 100 percent completion.

In one example aspect, a confidence level may be set by a user of system 100 that can be used to determine whether or not a document processing transaction is successful. For example, if an optical character recognition is performed on a document, a confidence level may be set at 95%. A configurator may interpret the result of the processing and determine the quality of the processed document. If the configurator determines that the scanned document is at 95% or more, the processing of the document may be considered a successful document processing transaction. If the quality is determined to be less than 95%, the processing may be determined to be unsuccessful, and may be recommended for manual handling.

In another aspect, tracking, reporting and analysis software 115 may determine if there is a significant change between a current document processing transaction, and a previously successful document processing transaction and identify whether the current transaction corresponds to a successful transaction. For example, if an archiving is performed on the document, tracking, reporting and analysis software 115 may determine if the archived document has a duplicate document that has been previously archived using the software program product. Upon positive determination, tracking, reporting and analysis software 115 may determine that the most recent archiving of the document has no significant difference with the previously archiving transaction and does not tag the recent archiving as a successful transaction. This aspect prevents the tracking, reporting and analysis software to report duplicate transactions that may incur redundant billing charges for the user. In another aspect, an authorized user of the software program product may set at least one criteria that will be used to determine whether a document processing transaction is a redundant transaction or not. Other criteria that may be set by the user to determine a successful document processing may be known by skilled artisans.

If the document has been successfully processed, as indicated by any of the aforementioned events, client application 105 sends a notice of the successful document processing transaction to tracking server 110 (at 410). Client application 105 may also send data associated with the successful document processing transaction such as, for example, a timestamp of the transaction, a copy of the processed document, the type of transaction performed on the document, a number of documents being processed if more than one document is processed using one document processing transaction, a number of pages of the document/s processed by the software program product, among other document processing transaction data as will be known by skilled artisans.

If the transaction is determined to not be successful such that the processing of the document failed, client application 105 reports unsuccessful document processing transaction to tracking server 110 (at 415). A document processing transaction may fail due to one or more factors such as, for example, if the document has not been successfully routed as a possible case when routing documents from one user to another. Other examples of failed document processing transactions include, but are not limited to, failed conversion of the document, a search for the document returning zero results, the document has not been index, among others as will be known in the art. Reporting of an unsuccessful document processing transaction by client application 105 to tracking server 110 may also include sending data regarding the failed transaction such as, for example, a timestamp of the transaction, the type of transaction attempted on the document, the number of pages of the document attempted to be processed, and the number of documents involved in the failed transaction, among others. An error in any of the document processes performed on a document may have significant adverse effects on a transaction and may be considered an unsuccessful document processing transaction. In this example aspect, manual processing of the document may be performed.

At 420, upon receiving the indication of at least one of a successful and a failed document processing transaction, and the data relating to the transaction, tracking server 110 records the received data in transaction data store 220. In one aspect, tracking server 110 transforms the received data into a specific format and stores the transformed data in data warehouse 225. Transforming the data into the specific format allows tracking server 110 to store the data in a consistent format and use the formatted data for auditing, generating billing reports, among others as will be known.

At 425, tracking server 110 checks if one or more transaction artifacts have been sent by client application 105 along with the transaction data. Upon positive determination, tracking server 110 saves the transaction artifacts to digital artifact store 130. Upon negative determination, the example method of monitoring and recording transaction ends and tracking server 110 waits for a new transaction to occur on client application 105 (at 430). In one example embodiment, checking for transaction artifacts may be an optional step in the monitoring and recording method shown in FIG. 4.

In another example embodiment of transaction monitoring and recording, client application 105 may be configured to send document processing transaction data relating to long-running transactions on tracking server 110. Long-running transactions may be document processing transactions that undergo multiple steps over a period of time before being completed. For example, a document indexing transaction that needs to be approved by more than one approver prior to being indexed may be a long-running transaction having more than one step, and may be processed over a period of time.

Figure 5:
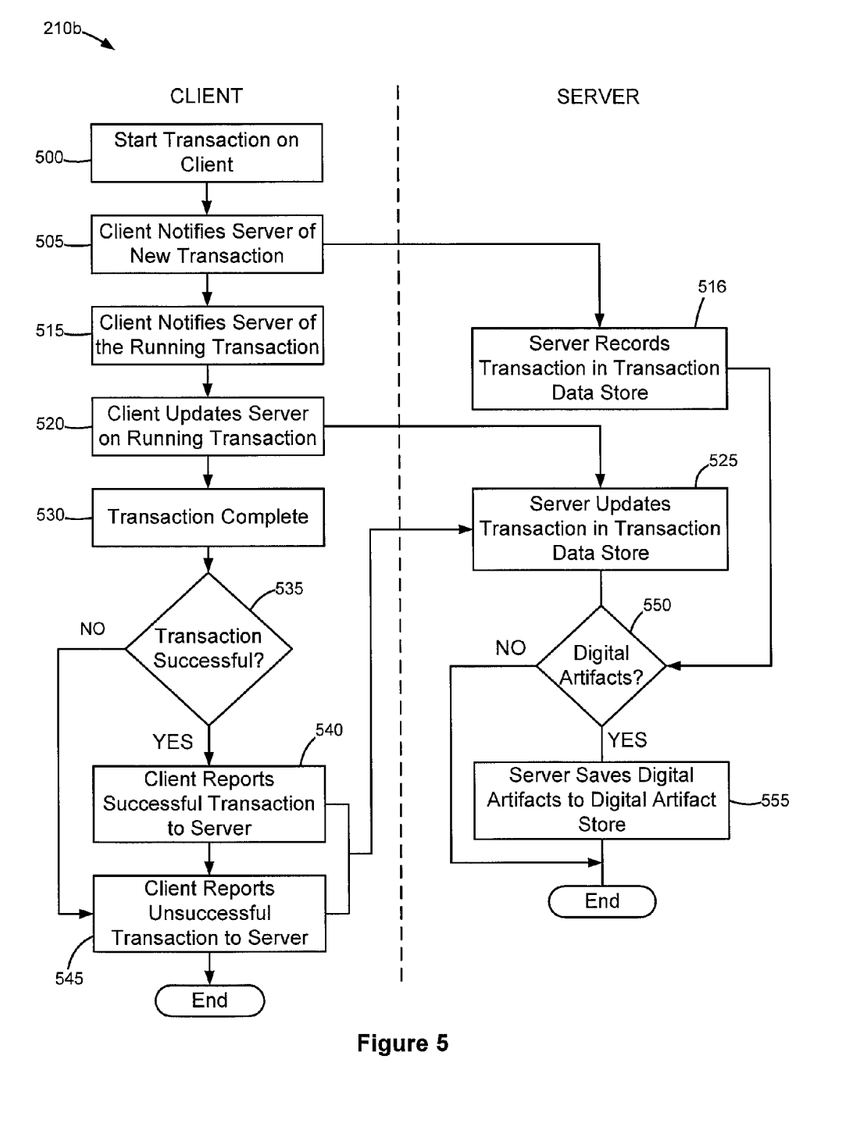
FIG. 5 is an example method of monitoring and recording long-running transactions that are processed in client application using the software program product.

FIG. 5 is an example method 210*b* of monitoring and recording long-running transactions that are processed in client application 105 using the software program product. The example method 210*b* is performed by tracking, reporting and analysis software 115 and may be executed upon a successful registration and/or log-on of client application 105 to tracking server 110.

At 500, client application 105 listens to one or more events from the software program product that indicates that a long-running transaction is started on at least one document. Starting the long-running transaction may occur when the user selects a transaction having multiple steps, and/or occurs over a period of time to process one or more documents with.

At 505, upon the client application 105 receiving an indication that the long-running transaction has been started on one or more documents, client application 105 notifies tracking server 110 of the new transaction. Notifying tracking server 110 of the new transaction includes sending data to tracking server 110 relating to the long-running transaction started such as, for example, timestamp of the starting of the transaction, the type of transaction to be performed on one or more documents, the documents to be processed, among others.

At 510, tracking server 110 then records the transaction and the data relating to the transaction in transaction data store 120. Alternatively, tracking server 110 may also transform the received data into a specific format suitable for further processing such as, for generating billing reports, auditing, and the like.

At 515, client application 105 listens for another event from the software program product that indicates an update is performed on the transaction started at 500 and sends data relating to the update to tracking server 110 (at 520). Client application 105 may determine if the update occurs on the transaction by monitoring an identifier of the transaction and listening for one or more updates on the transaction associated with the identifier. For example, for a transaction that handles a document requiring two approvers, client application 105 may listen for an update on the identifier associated with the transaction such as, when the document has been approved by a first approver. Upon positive determination, client application 105 sends data relating to the update such as, for example, the approver and the timestamp of the first approval, to tracking server 110.

At 525, tracking server 110 updates the transaction stored in transaction data store to reflect the update sent by client application 105. Client application 105 may listen for further updates and may send data relating to the further updates to tracking server 110, accordingly.

At 530, client application 105 may receive an indication from the software program product that the transaction has been completed such that the document may have been successfully or unsuccessfully processed (at 535). At 540, if the transaction is successful, client application 105 sends a notice of a successful document processing transaction to tracking server 110, and tracking server 110 may update the transaction in transaction data store 120 to reflect the change (at 525). Client application 105 may also send data associated with the successful document processing transaction such as, for example, a timestamp of when the transaction was completed, a copy of the processed document, the type of transaction performed on the document, a number of documents being processed if more than one document is processed using the document processing transaction and a number of pages of the document/s processed by the software program product.

If the transaction is determined to not be successful such that the processing of the document failed, client application 105 reports unsuccessful document processing transaction to tracking server 110 (at 545), and tracking server 110 updates the transaction in transaction data store 120, accordingly (at 525).

At 550, tracking server 110 checks if one or more transaction artifacts have been sent by client application 105 along with the transaction data. Upon positive determination, tracking server 110 saves the transaction artifacts to digital artifact store 130 (at 555). Upon negative determination, the example method of monitoring and recording transaction ends and tracking server 110 waits for a new transaction to occur on client application 105. In one example embodiment, checking for transaction artifacts may be an optional step in the monitoring and recording method shown in FIG. 5.

In yet another example embodiment of transaction monitoring and recording, client application 105 may also be configured to send a volume of document processing transaction data to tracking server 110 on a scheduled date and time. The volume refers to one or more document processing transactions that occurred during a period of time as is typical in batch reporting of document processing transactions. This example embodiment may be performed for system performance purposes wherein the sending of the data from client application 105 to tracking server 110 is performed during an optimal time such as, for example, during non-peak hours.

Figure 6:
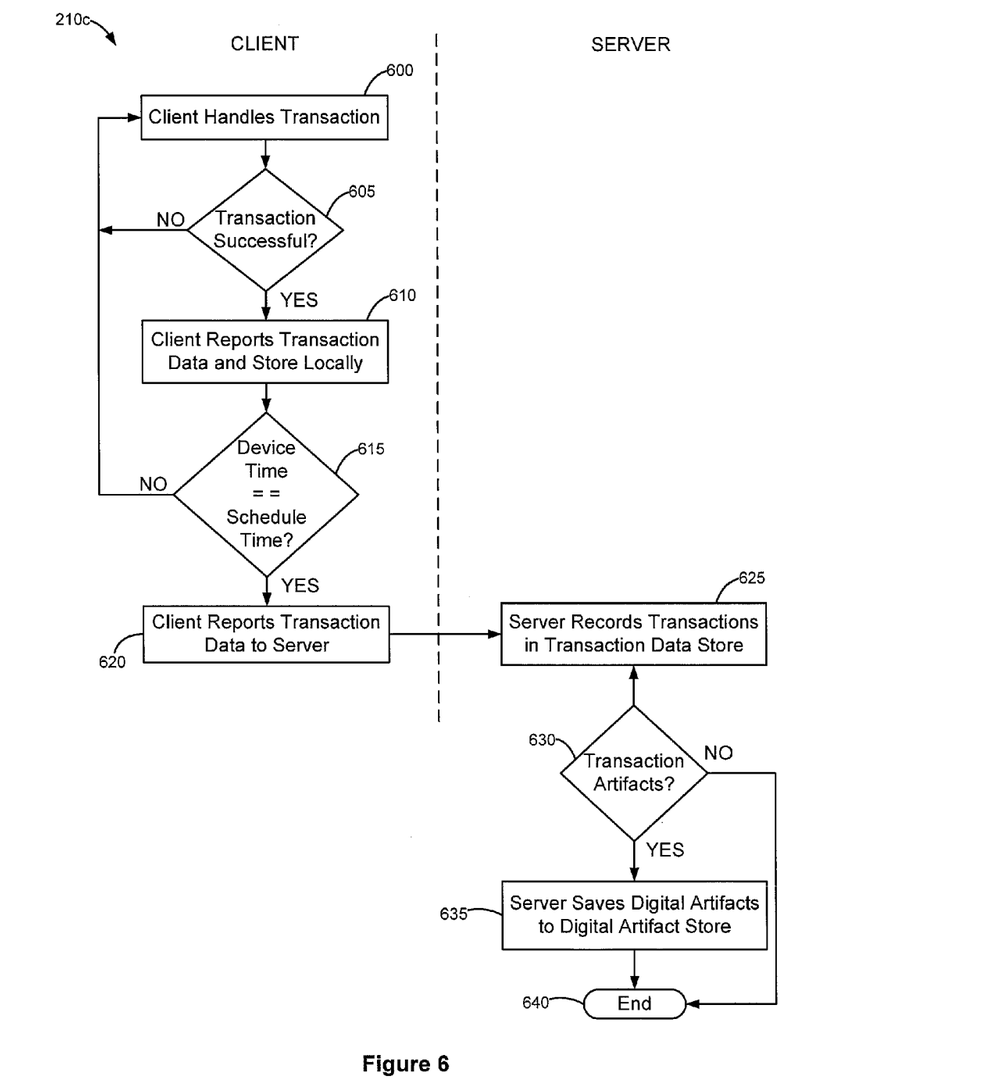
FIG. 6 shows an example method of monitoring and recording document processing transactions from client application to tracking server as a batch and on a pre-scheduled time.

FIG. 6 shows an example method 210c of monitoring and recording document processing transactions from client application 105 to tracking server 110 as a batch and on a pre-scheduled time.

At 600, client application 105 handles a transaction when the user of client application 105 initiates processing of a document using the software program product. Handling the transaction may include listening for an event that indicates that the document is being processed using the software program product.

At 605, if the transaction is successful such that the document is successfully processed, client application 105 may collect the transaction data relating to the successful transaction and store it locally on client application 105 (at 610). Alternatively, client application 105 may also store the transaction data in another device communicatively connected to client application 105.

At 615, client application 105 monitors the device time and determines if the device time falls on a scheduled time for sending the collected transaction data to tracking server 110. The collected data may be data relating to one or more transactions collected over a period of time wherein device time has not yet matched the scheduled time. The scheduled time may be defined by the user of client application 105, or by an administrator of system 100. If the device time matches the scheduled time, client application 105 sends the data to tracking server 110 for recording in a similar process as described above (at 620).

If the device time does not match the scheduled time, client application 105 continues handling transactions processed by the software program product and collects data relating to successful transactions until the device time matches the scheduled time. In one aspect, client application 105 may delete the transaction data that have been sent to tracking server 110 from client application 105 to make space for a new batch of data to be collected by client application 105 after sending the previous volume at the scheduled time.

At 625, tracking server 110 records the transaction data received from client application 105 in transaction data store 120, and checks if one or more transaction artifacts have been sent by client application 105 along with the volume of transaction data (at 630). Upon positive determination, tracking server 110 saves the transaction artifacts to digital artifact store 130 (at 635). Upon negative determination, the example method of monitoring and recording transaction ends (at 640) and tracking server 110 waits for the next scheduled time to receive another batch of document processing data from client application 105.

With continued reference to FIG. 2, at 215, while tracking server 110 may be configured to receive transaction data in a generic raw format, tracking server 110 may also be configured to transform the received data into a more specific and more meaningful format such as, for example, cost. Transforming the data into cost may include valuating the data into a billing amount using one or more variables, and charging the customer with the billing amount generated using the variables.

Transforming the data into cost and charging the customer with the billing amount may be performed concurrent to or upon tracking server 110 receiving the document processing transaction information from client application 105. In this example aspect, the customer using the software program product to process one or more documents may be automatically charged for every successful processing performed using the software. In another aspect, the assigning of the billing amount and the charging of the customer using the billing amount may be performed upon receiving a predetermined number of documents successfully processed using the software program product.

In one example embodiment, the number of pages of the processed document may be used to determine a cost or a billing amount for the transaction. For example, tracking server 110 may assign a billing amount such that when the software program product processes a document having ten pages, an example charge of $0.10 may be assigned to the transaction. If the transaction data received by tracking server 110 indicates that the document successfully converted using the software program product has twenty pages, for example, tracking server 110 may assign a billing amount of $0.20 on the transaction.

In another example embodiment, the type of transaction may be used to determine the cost or the billing amount for the transaction. For example, tracking server 110 may assign a billing amount of $0.10 for every document indexing process performed in client application 105 using the software program product, and $0.20 for a document routing process. When a billing period has passed such that a billing report has to be generated to the customer using the software program product, tracking server 110 may calculate the total charge using the billing amounts of all the transactions performed in client application 105 using the software program product during the billing cycle.

In yet another example embodiment, the number of documents processed using the software program product may be used to determine the cost or the billing amount for the client application 105. For example, tracking server 110 may continuously keep track of the number of documents processed in client application 105 using the software program product and for every document, an example charge of $0.05 may be used to calculate the total amount to charge the customer in a billing period. Alternatively, the volume of the documents may be used as the basis such as, for example, for every ten documents processed, an amount of $0.10 may be charged. In another alternative aspect, the number of processing transactions successfully performed in the client application over a period of time (e.g. billing period) may be used to calculate the amount to charge the customer.

In case of an unsuccessful document processing transaction, wherein at least one error occurs during the processing, or the processing has not reach an acceptable level of completion, charges may not be applied.

With the valuated transactions, reporting and analysis may be performed on the valuated data such that a user can use the valuated transactions to generate other documents such as, for example, billing reports. The valuated transactions may also be used to check for costing, and other business processes as will be known in the art.

Alternatively, the valuated transaction data may be used to integrate into an enterprise resource planning (ERP) software that may be used by the customer to store and manage data and review business processes using the valuated transactions.

The various example embodiments of monitoring and recording transactions in FIGS. 4-6 are designed to work with the client-server configuration shown in system 100 of FIG. 1. In these example embodiments, client application 105 sends the data using an application programming interface (API). The API may be designed to be as generic as possible to accommodate a wide variety of client types and transaction types. Using an API, tracking server 110 can be configured to accept transaction data from one or more client applications having more than one client types. For each client type, there may be one or more transaction types and each client application and transaction type may be assigned a globally unique identifier to ensure no conflicts from receiving data with other clients. The API may be able to accept a different set and quantity of data for each transaction type.

Table 1 shows example functions or API calls included in the API for performing method 200 that may be used to perform the steps in example methods detailed in FIGS. 4-6.

| Name | Protocol Defined Parameters | Generic Parameters | Payload | Return |
|---|---|---|---|---|
| completeSuccessfulTransaction | transactionId | Optional parameters which represent the details of the transaction. | Optional transaction artifacts. | <none> |
| completeUnsuccessfulTransaction | transactionId | Optional parameters which represent the details of the transaction. | Optional transaction artifacts. | <none> |
| recordBatchTransactions | clientId transactionType | For each transaction: Success (true or false) Optional parameters which represent the details of the transaction. | For each transaction: Zero or more optional artifacts. | <none> |
| recordSuccessfulTransaction | clientId transactionType | Optional parameters which represent the details of the transaction. | Optional transaction artifacts. | transactionId |
| recordUnsuccessfulTransaction | clientId transactionType | Optional parameters which represent the details of the transaction. | Optional transaction artifacts. | transactionId |
| registerClient | clientType | Parameters which uniquely identify the client for later lookup or reporting purposes (eg. IP address) | <none> | clientId |
| startTransaction | clientId transactionType | Optional parameters which | Optional transaction | transactionId |

| Name | Protocol Defined Parameters | Generic Parameters | Payload | Return |
|---|---|---|---|---|
| | | represent the details of the transaction. | artifacts. | |
| unregisterClient | clientId | <none> | <none> | <none> |
| updateTransaction | transactionId | Optional parameters which represent the details of the transaction. | Optional transaction artifacts. | <none> |

For example, function completeSuccesfulTransaction is an example function that indicates a successful transaction in client application 105 and may be sent by client application 105 to tracking server 110 for recording in transaction data store 120 or for updating an entry in the data store 120. It will be understood that the example functions in Table 1 are for illustrative purposes and should not be considered limiting.

In these example API calls, the API calls may comprise five parts including a name of the method (e.g. completeSuccessfulTransaction, recordBatchTransactions, etc); a set of protocol-defined required parameters known to both client application 105 and tracking server 110 that, for example, uniquely identify the calling client, provide the type of transaction when recording a new transaction, or identify an individual transaction when providing an update to that transaction. The exact parameters may depend on the API method. The API calls may also include an optional set of parameters known only to the client application 105. Tracking server 110 may treat these parameters generically or in the raw format, and records them for a given transaction or uses them to derive costs or other values based on configuration rules specific to the type of client application and type of transaction. These parameters consist of key-value pairs and each value must be in Boolean, number, text or binary form. The API calls may also include an optional payload of transaction artifacts (such as documents) that may be stored for a given transaction. Payloads are typically binary and streamed. An optional return value may also be included in the API calls. These optional return values are typically sent back from tracking server 110 to client 105 to provide the requested information, such as the ID of a newly created transaction record.

During the transaction monitoring and recording stage (at 210 of FIG. 2) and using example methods of FIG. 4-6, client application 105 calls API methods to send transaction data. The API also allows a tracking system to accept digital artifacts (in generic binary form) from transactions. Digital artifacts from transactions are typically archived, as discussed above. Individual transactions may be recorded in a single API method call (recordSuccessfulTransaction or recordUnsuccessfulTransaction, see FIG. 4) or in a series of calls (startTransaction, etc.) if the transaction is long running or has multiple steps (see FIG. 5). For transactions that are recorded in multiple calls, any parameter values with the same keys are overwritten on the later calls. For performance or other reasons, it may be desirable that transactions be recorded in batch form perhaps during non-peak hours (see FIG. 6).

Figure 7:
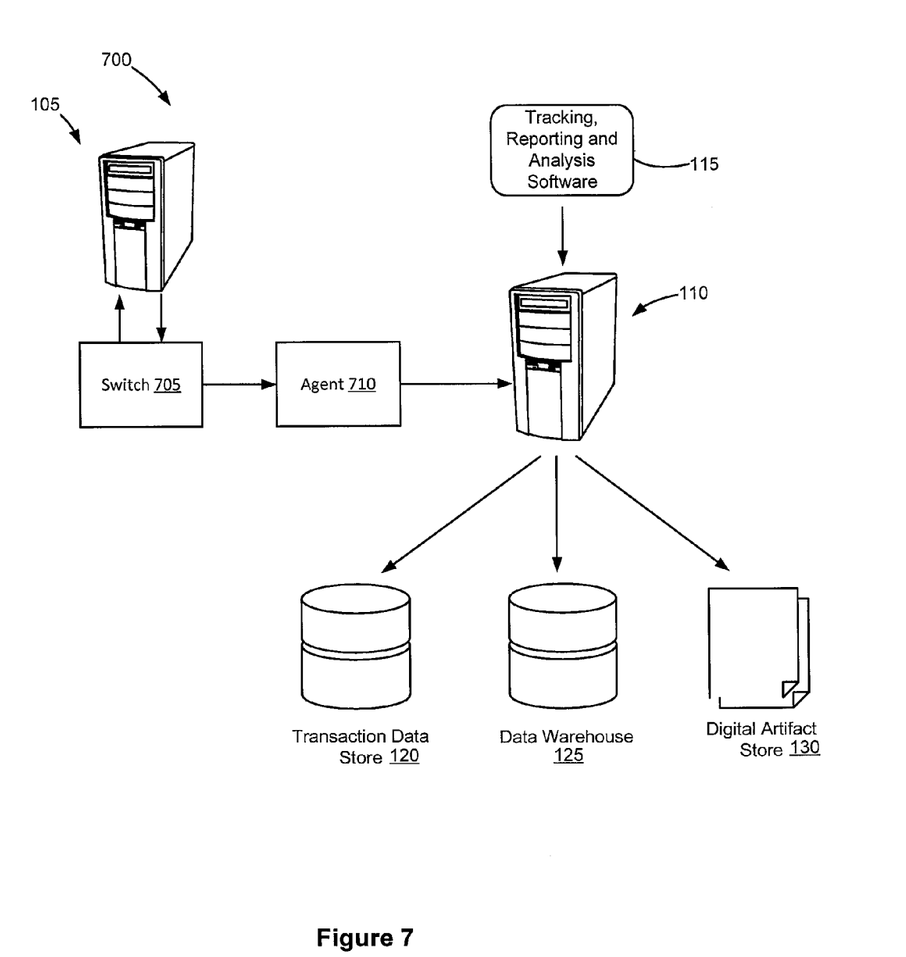
FIG. 7 shows an example embodiment of a document processing system that tracks and valuates document transaction processing in a client using a software program product without the client application directly sending transaction information to a tracking server.

FIG. 7 shows an example embodiment of a document processing system 700 that tracks and valuates document transaction processing in a client using a software program product without the client application directly sending transaction information to a tracking server. In this example embodiment, client applications may use an external measure of activity such as input and/or output data volumes on a key port, or using a key process, as will be known in the art.

System 700 includes at least one client application 105, tracking server 110, tracking, reporting and analysis software 115, transaction data store 120, data warehouse 120, and digital artifact store 125. Client application 105 connects with tracking server 110 through a switch 705 and an agent 710. Switch 705 is a network switch that is able to connect client application 105 to other devices, such as agent 710, on a computer network. Typically, switch 705 connects at least two devices together using a form of packet switching. Other forms of connecting client application 105 with agent 710 will be known to skilled artisans.

Using switch 705, client application 105 connects to agent 710, to send information regarding document processing transactions performed in client application 105 using the software program product. Agent 710 may be a device communicatively connected to tracking server 110 that receives and/or retrieves information regarding document processing transactions performed in client application 105 and sends the information to tracking server 110 for tracking, monitoring, and valuating, as discussed above with regards to 210a-210c.

In system 700, client application 105 processes incoming data and/or produces outgoing data in one or more ports through switch 705, and switch 705 intercepts the incoming and/or outgoing data and mirror the intercepted data to agent 710. Agent 710 may also include one or more instructions that measure the volume of document processing transactions performed in client application 105, and send the volume to tracking server 110.

Similar to the example methods 210a-210c of monitoring and recording transactions, a pricing model may be created based on the volumes send to tracking server 110 from client application 105 through switch 705 and agent 710. For example, an administrator of system 700 may calibrate the tracking of system 700 by sending a known number of jobs at a known rate through system 700 while monitoring data flows to and from client application 105. Based on the monitored data, the desired price per document processing transaction may be expressed as an approximate price per unit of data processed. The data processed may refer to the number of documents processed, or the number of pages processed.

This example document processing system is also able to support a tiered pricing model wherein customers are allowed to select from a set of pricing tiers at progressively increasing price points in order to process one or more documents using the software program product according to the customers' needs. Other pricing schemes may also be utilized.

The foregoing illustrates various aspects of the invention. It is not intended to be exhaustive. Rather, it is chosen to provide the best illustration of the principles of the invention and its practical application to enable one of ordinary skill in the art to utilize the invention, including its various modifications that naturally follow. All modifications and variations are contemplated within the scope of the invention as determined by the appended claims. Relatively apparent modifications include combining one or more features of various embodiments with features of other embodiments.

The invention claimed is:

1. A method of charging a customer for using a software program product installed in a computing device, the software program product configured to process one or more documents, comprising:
receiving by a tracking server from the computing device information relating to at least one successful processing of the one or more documents using the software program product;
upon receiving the information relating to the at least one successful processing of the one or more documents using the software program product, assigning by the tracking server a billing amount for each of the one or more documents successfully processed using the software program product based on the received information; and
using the billing amount, charging the customer for using the software program product to process the one or more documents,
wherein the information relating to the at least one successful processing of the one or more documents is received by the tracking server from the computing device after the computing device determines that a result of processing the one or more documents passes a pre-determined measurement of success indicating that the one or more documents have been processed successfully by the software program product.

2. The method of claim 1, wherein the receiving the information relating to the at least one successful processing of the one or more documents includes receiving information relating to at least one document converted from one format to another using the software program product.

3. The method of claim 1, wherein the receiving the information relating to the at least one successful processing of the one or more documents includes receiving information relating to at least one document delivered from one device to another device using the software program product.

4. The method of claim 1, wherein the receiving the information relating to the at least one successful processing of the one or more documents includes receiving information relating to at least one document indexed using the software program product.

5. The method of claim 1, wherein the assigning the billing amount is performed concurrent to the receiving the information relating to the at least one successful processing of the one or more documents using the software program product.

6. A system for charging a customer for using a software program to process one or more documents, comprising:
a computing device installed with the software program, the software program including one or more executable instructions to:
process the one or more documents using the software program;
determine if the processing of the one or more documents is successful by determining if a result of the processing passes a pre-determined measurement of success indicating that the one or more documents have been processed successfully by the software program; and
if the result of the processing passes the pre-determined measurement of success, send information relating to a successful processing of the one or more processed documents to a tracking server for billing; and
the tracking server communicatively connected to the computing device via the software program, the tracking server including one or more executable instructions to:
receive the information from the computing device regarding the successful processing of the one or more documents using the software program; and
upon receiving the information from the computing device regarding the successful processing of the one or more processed documents, assign a billing amount for the successful processing based on at least one of the information relating to the one or more processed documents and a type of processing performed on the one or more processed documents,
wherein the computing device is part of a plurality of second computing devices each having the software program installed therein and including the same one or more executable instructions, and wherein the tracking server is communicatively connected to each of the plurality of second computing devices and includes an executable instruction to determine a corresponding charge for one or more documents processed in each of the plurality of computing devices.

7. The system of claim 6, wherein the instructions to determine by the computing device if the processing of the one or more documents is successful includes instructions to determine if the processing of the one or more documents is significantly different from a previously performed successful processing of the one or more documents.

8. The system of claim 6, wherein the instructions to determine if the result of the processing passes the pre-determined measurement of success includes instructions to determine if the result of the processing of the one or more documents has met a pre-configured confidence level that indicates that the processing of the one or more documents is successful.

9. The system of claim 8, wherein the instructions to determine if the result of the processing passes a pre-determined measurement of success includes instructions to determine if the processing of the one or more documents has substantially zero errors.

10. The system of claim 6, wherein the tracking server further includes one or more instructions to:
receive a notice from the computing device that the software program received a command to initialize a processing of a document;
create an entry in a database corresponding to the processing initialized at the software program;
receive an update, from the computing device, regarding a status of the processing by the software program, the status relating to at least one processing performed on the document;
update the entry in the database based on the update received from the computing device; and receive information regarding a completed processing of the document, the completed processing of the document corresponding to a successful processing of the document by the software program.

11. The system of claim 10, wherein the computing device further includes one or more instructions to send the notice to the tracking server when the software program receives the command to initialize the processing of the document that is performed over a period of time by the software program.

\* \* \* \* \*